United States Patent

[11] 3,630,681

| [72] | Inventor | Yoshijiro Arikawa |
| --- | --- | --- |
| | | Hitachi-shi, Japan |
| [21] | Appl. No. | 742,993 |
| [22] | Filed | May 14, 1968 |
| [45] | Patented | Dec. 28, 1971 |
| [73] | Assignee | Hitachi, Ltd. |
| | | Tokyo, Japan |
| | | Continuation-in-part of application Ser. No. 393,539, Sept. 1, 1964, now abandoned. This application May 14, 1968, Ser. No. 742,993 |

[54] METHOD OF SEPARATING MIXTURES BY LIQUID CHROMATOGRAPHY
27 Claims, 6 Drawing Figs.

[52] U.S. Cl.................................... 23/230, 23/253, 210/25, 210/31, 260/534
[51] Int. Cl........................................G01n31/04, G01n31/08, G01n31/22
[50] Field of Search............................ 39/3, 539; 23/230, 253, 232 C; 210/25, 31, 31 C; 260/518, 534 S, 534 G

[56] References Cited
UNITED STATES PATENTS

| 2,700,054 | 1/1955 | White.......................... | 260/534 S |
| 3,003,866 | 10/1961 | Mattano et al................ | 210/31 X |
| 3,230,048 | 1/1966 | Skeggs.......................... | 23/230 |

OTHER REFERENCES

Alexander et al., " A Specific Micromethod for the Colorimetric Determination of Glycine in Blood and Urine," J. Bio. Chem. 160:51– 59 (1945).

Spackman et al., " Automatic Recording Apparatus for Use in the Chromatography of Amino Acids," Anal. Chem. 30:1190– 1206 (1958).

Snell-Hilton, Encyclopedia of Industrial Chemical Analysis, V. 1, 401– 05 (1966)

*Primary Examiner*—Morris O. Wolk
*Assistant Examiner*—D. G. Conlin
*Attorney*—Craig, Antonelli, Stewart and Hill ABSTRACT: Method for separating components of a mixture by liquid chromatography, said components containing chemically coordinative groups, which comprises adsorbing weakly basic metal ions on an ion exchange resin column, introducing the mixture into said column, whereby complex compounds are formed between said metal ions and said coordinative groups, adding an eluting solution to said column, thereby separating the components of the mixture as their complexes and detecting the separated components eluted from the column. Detection is preferably effected by a color-developing reaction with said complexes. A further feature is to maintain a constant metal ion concentration on the column by using an eluting solution containing said metal ion.

METHOD OF SEPARATING MIXTURES BY LIQUID CHROMATOGRAPHY

BACKGROUND OF THE INVENTION

This is a continuation-in-part of application Ser. No. 393,539, filed on Sept. 1, 1964, now abandoned.

The present invention is directed to a method of separating components of mixtures by liquid chromatography. More particularly, the present invention relates to a method of separating components of a mixture by the formation of complex compounds between metal ions and components of said mixture containing chemically coordinate groups.

As the conventional method for separating amino acids using a liquid chromatograph, the ion exchange method has been generally employed. This method utilizes the differences of distribution coefficients of various amino acids in a cation exchange resin, said coefficients being dependent mainly on dissociation degrees of carboxyl groups contained in the amino acids. The difference of distribution coefficients causes a difference of migration rates of the amino acids so that respective amino acids are separated when their mixture passes through the ion exchange resin column. However, among respective amino acids, particularly among acidic and neutral amino acids and more particularly between glycine and alanine, the difference of dissociation degrees is not very large. Accordingly, if it is desired to separate these compounds, not only is a long and large column required, but also operating conditions such as column temperature and eluting solution must be changed in one separating operation. Thus, this method has the disadvantages that its separating procedure is complicated, the separation time is very long and furthermore its apparatus is large and complicated.

In the case of applying an ion exchange method for the separation of amino acids, the detection method generally employed is the ninhydrin colorimetric method. This method is based on the determination of absorbance (light absorption) of colored substances produced by the reaction of the ninhydrin reagent with amino acids contained in a sample. For instance, for the detection of $\alpha$-amino acids, the maximum absorption of Ruhemann purple is utilized. However, this method has disadvantages in that it needs "heating" to effect the reaction of the sample and the ninhydrin reagent to produce colored substances and also the ninhydrin reagent must be preserved in a cool and dark place in the absence of air.

SUMMARY OF THE INVENTION

An object of the present invention is to provide an improved method of separating mixtures by liquid chromatography which eliminates the disadvantages of the prior art processes.

Another object of the present invention is to provide an improved method of separating components of a mixture by liquid chromatography wherein the separation time is reduced and a heating treatment which heretofore has been required for developing color in the detection of separated amino acids is eliminated.

A further object of the present invention is to provide an improved chromatographic method of separating components of a mixture which provides improved reproducibility of analytical results utilizing an apparatus which is not as large and complicated as that used in the prior art.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention it has been found that the above-mentioned disadvantages may be eliminated and a much improved method of separating components of mixtures by liquid chromatography has been developed wherein weakly basic metal ions are absorbed on an ion exchange resin column and the mixture containing component compounds having chemically coordinative groups is introduced into said column whereby complex compounds are formed between said metal ions and said coordinative groups. An eluting solution is added to the column thereby separating the components of the mixture as their complexes depending upon the difference in coordinative bond forces for the absorbed metal ions as said components flow through the column. Detecting the separated components eluted from the column is advantageously effected by a color-developing reaction with said complexes. A further feature of the present invention is to maintain a constant metal ion concentration on the column by using an eluting solution containing said metal ion.

According to the present invention, the shortened separation time is attained by providing a metal salt-form resin column adapted to absorb weakly basic metal ions which are readily reactive with a sample containing mixed component materials (hereinafter simply referred to as "components") having coordinative groups, on an ion exchange resin to form complex compounds. A pump is connected to the upper end of said column for feeding an eluting solution thereto, and a detecting system is connected to the lower end of said column. The sample components are continuously separated utilizing the difference of complex forming forces between the sample components and the absorbed metal ion, and the separated sample components are detected in said detecting system.

The sample components are detected using a reagent which develops color in its reaction with the combined metal ion in the complex compounds separately flowing out from the lower end of the metal salt-form resin column.

Reproducibility is attained by adding to the eluting solution the same metal ion in a predetermined concentration, equilibrating with the content of weakly basic metal ion having been absorbed on the resin so as to maintain the latter content constant at all times.

According to the present invention, instead of using the conventional ion exchange method as the separating method, a unique complex formation method using a metal salt-form resin column is employed, in which the difference of complex-forming forces of the sample components with the weak basic metal ion absorbed on the ion exchange resin, or the difference of their stabilities as complex compounds, is utilized. Since a complex-forming reaction is more selective than an ion exchange reaction, the former shows specific selectivity for sample components and enables rapid separation. By this method, not only is separation time reduced, but also the changing of column temperature and eluting solution are no longer necessary, and moreover the column length is reduced. Accordingly, the apparatus is simplified and can be reduced in size.

Furthermore, the metal salt-form resin column of the present invention makes it possible to separate not only amino acids but also amines, organic acids and the like having coordinative groups and effecting a complex-forming reaction with the weak basic metal ions.

According to the present invention the expression "weak basic metals" is intended to include the alkaline earth metals, the transition elements, the rare earths, etc., and does not include the highly basic alkali metals which have difficulty in or cannot form complexes with components of a mixture having coordinative groups.

The coordinative bond is formed by two electrons necessary to form a chemical bond and provided by only one of the reacting molecules. For example, such a bond is formed between $Cu^{2+}$ and ammonia or $Cu^{2+}$ and ethylenediamine.

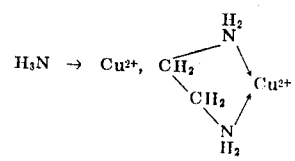

Among atoms constituting these compounds, a few can provide a pair of electrons, for example, oxygen, nitrogen, and sulfur. Compounds having these coordinative radicals are called the coordinative groups. Above-mentioned ammonia and ethylenediamine are coordinative groups having the amine radical ($-NH_2$) as a coordinative radical. Coordinative bonds have greater bond forces than ion bonds and there are delicate differences in bond forces among organic compounds according to their structures. The coordinative bond-forming reaction is more selective and specific, depending on the structure and kind of compounds than the ion bond-forming reaction caused by an electrostatic coulomb force. Consequently, according to the chromatography process of the present invention by utilizing the difference in coordinative bond forces, separation of the compounds having coordinative radicals can be obtained very selectively.

When a complex compound ($MY^{m-n}$) is formed from a metal ion ($M^{m+}$) and an organic compound ($Y^{n-}$) acting as a coordinative group according to the following reaction, $$M^{m+} + Y^{n-} \rightleftarrows MY^{m-n}$$

strength of the coordinative bond is determined by the stability constant ($K$) in the above reaction. The stability constant $K$ is defined by the following relation:

$$K = [MY^{m-n}]/[M^{m+}][Y^{n-}]$$

The greater the value of $K$, the stronger is the coordinative bond, resulting in complex compounds ($MY^{m-n}$) which are readily formed and quite stable. Thus $K$ is called the stability constant or the forming constant.

The relative strength of coordinative bonds, which can be determined by values of $K$, are greatly influenced by the properties of the metal ions and organic compound acting as the coordinative groups. For a given coordinative group, a metal ion which has the stronger tendency to accept electrons, that is, has the weaker basicity, has the stronger coordinative bond force. In the following table, there are shown stability constants $K$, in logarithm, between a number of metal ions and ethylenediaminetetraacetic acid (usually abbreviated as EDTA or Y) as a coordinative group, which is a derivative of an amine:

TABLE.—STABILITY CONSTANTS OF SOME METAL-EDTA* COMPLEXES

| Complex | Log K | Complex | Log K | Complex | Log K |
|---|---|---|---|---|---|
| (LiY)³⁻ | ª 2.8 | (VY)²⁻ | 12.7 | (CoY)²⁻ | 16.3 |
| (NaY)³⁻ | ª 1.7 | (VY)¹⁻ | 25.9 | (CoY)¹⁻ | ᵈ 40.7 |
| (MgY)²⁻ | 8.7 | [V(OH)Y]²⁻ | 9.6 | (NiY)²⁻ | 18.6 |
| (CaY)²⁻ | 10.7 | (VO)Y]²⁻ | 18.8 | (PdY)²⁻ | ᵇ,ᵉ 18.5 |
| (SrY)²⁻ | 8.6 | (VO₂)Y]³⁻ | 18.1 | (CuY)²⁻ | ᶠ 18.8 |
| (BaY)²⁻ | 7.8 | (CrY)¹⁻ | 23 | (AgY)³⁻ | 7.3 |
| (ScY)¹⁻ | 23.1 | [Cr(OH)Y]²⁻ | 7.6 | (ZnY)²⁻ | 16.5 |
| (YY)¹⁻ | 18.1 | [Cr(OH)₂Y]³⁻ | 10.0 | (CdY)²⁻ | 16.6 |
| Rare earths | (ᵍ) | (MnY)²⁻ | 14.0 | (HgY)²⁻ | 21.8 |
| (PuY)¹⁻ | 18.1 | (FeY)²⁻ | 14.3 | [Hg(OH)Y]³⁻ | 9.1 |
| (TiY)¹⁻ | ᵇ 21.3 | [Fe(OH)₂Y]³⁻ | 9.1 | (AlY)¹⁻ | 16.1 |
| (TiY)⁰ | ᵇ 19.4 | [Fe(OH)Y]¹⁻ | 9.8 | (GaY)¹⁻ | 20.3 |
| (TiOY)²⁻ | ᵇ 17.3 | (FeY)¹⁻ | 25.1 | (InY)¹⁻ | 25.0 |
| (ZrY)⁰ | 19.9 | [Fe(OH)Y]²⁻ | 7.5 | (TlY)³⁻ | ᵇ,ᵉ 5.8 |
| (HfY)⁰ | ᵇ 19.2 | [Fe(OH)²Y]³⁻ | ᵉ 9.4 | (PbY)²⁻ | 18.0 |
| (ThY)⁰ | 23.2 | [Fe(OH)₃Y]⁴⁻ | ᵉ 12.3 | | |

NOTE: Values at 20° and ionic strength μ=0.1 (KCl or KNO₃); Y=anion of ethylenediamine tetraacetic acid.
ª μ=0.01.
ᵇ 25°.
ᶜ μ=1.0.
ᵈ μ, indefinite.
ᵉ 0.2 molar HClO₄.
ᶠ μ=0.03.
ᵍ Rare earths, for example, AM³⁺, Dy³⁺, Er³⁺, Gd³⁺, Ho³⁺, Lu³⁺, Nd³⁺, Pr³⁺, Sm³⁺, Tm³⁺, Yo³⁺, increase in log K values from 15.1 for (LaY)¹⁻ to 19.8 for (LuY)¹⁻.

By comparing values of a log $K$ in the table, it will be noted that values of log $K$ between EDTA and alkali metals are extremely small, for example between about one and three. Alkali metals are strongly basic and provide very weak coordinative bonds. Thus, even if these alkali metals are used in a metal salt-type resin column for liquid chromatography, no complex compound will be formed and improvement of separation due to the selective complex forming reaction is impossible. From these facts it is apparent why the alkali metals are excluded from those metal ions which can be employed in the chromatography method of the present invention.

When the log of the stability constant $K$ is at least twice as large as that for the alkali metals, for example greater than seven, this indicates strength of the coordinative bond and the formation of complex compounds. Thus, for example, since the alkaline earth metals such as magnesium, calcium, strontium, and barium have values of log $K$ greater than seven they exhibit a relatively weak basicity and a strong tendency to form complex compounds. Accordingly, the alkaline earth metals, when absorbed in a resin column, can be effectively used to improve separation of organic compounds such as amino acids acting as coordinative groups.

Metal ions, such as cobalt, nickel, zinc, copper, cadmium, mercury and thorium, which are weak basic metals have values of log $K$ greater than 15 and thus are much more weakly basic and therefore have a much stronger tendency to form complex compounds. A resin column which is absorbed with these metal ions is, of course, effective in improving the selectivity based on the complex forming reaction, as shown in the examples with regard to amino acid separation.

Members of the rare earths having similar properties, such as La, Y, Ce, Pr, Nd, Pm, Sm, Eu, Gd, Tb, Dy, Ho, Er, Tm, Yb, Am and Lu, have values of log K in a range of 15.1 to 19.8 as shown in the table. All of these elements show substantially the same degree of weak basicity and thus when absorbed to a resin column, they improve selectivity of separation.

Furthermore, it should be noted that $Fe^{3+}$, $Fe^{2+}$, $Pb^{2+}$, $Mn^{2+}$, $Sc^{3+}$, $Ga^{3+}$, $Cr^{3+}$, $Zr^{4+}$, $Hf^{4+}$, $In^{3+}$, $Ti^{3+}$, etc., also have large values of log $K$ and thus can also be utilized for separation of organic compounds acting as coordinative groups when they are adsorbed in an ion exchange resin.

As can be readily seen from the complex compound forming constants between various metal ions and ethylenediaminetetraacetic acid as explained above, it is clear that as compared with the alkali metals which are excluded from the useful metals of the present invention, the aforementioned metal ions have much greater coordinative bond forces with organic compounds acting as coordinative groups and therefore are effective in improving separation of the organic compounds depending on differences in complex-forming forces or coordinative bond forces.

According to another feature of the present invention, instead of using the conventional ninhydrin colorimetric detecting method, colors are developed with reagents which effect color developing reactions with combined metal ions contained in the complex compounds composed of sample components and weak basic metal ion and separately flowing out from the lower end of the column The light adsorptions of the colored substances are determined in order to indirectly detect sample components.

More particularly, in the metal salt-form resin column, sample components flow out from the column as complex compounds, each in a given proportion to the whole to satisfy the equilibrium of the complex forming reaction in dependence upon the pH of the eluting solution, ionic strength and concentration of the weak basic metal ion, etc. Accordingly, sample components can be indirectly detected by color development of the combined metal ion of the complex compounds.

Reagents effecting color-developing reactions with a weak basic metal ion, include such compounds as 2-carboxyl-2-hydroxy-5'-formazylbenzene, xylenol orange and pyrocatechol violet. These reagents do not require any heating to effect their color-developing reaction with a weak basic metal ion. Because of their chemical stability, these reagents require neither the absence of air nor preservation in a dark cool place. Of course, in the metal salt-form resin column the conventional ninhydrin method can also be used, but a heating treatment is needed for color development.

According to another feature of the present invention, in order to maintain the content of weak basic metal ion adsorbed on the ion exchange resin in the metal salt-form resin column, constant at all times, the same metal ion is added to the eluting solution in a predetermined concentration to maintain an equilibrium with the above content of adsorbed ion. This procedure improves the reproducibility of analytical results.

Unless the same metal ion as the adsorbed ion is added to the eluting solution, the eluting solution flowing into the column causes the metal ion adsorbed on the ion exchange resin to elute into the solution so as to satisfy the distribution equilibrium between the ion exchange resin and the solution, in dependence upon the pH and the composition of the solution; consequently the content of adsorbed ion decreases. This lowers the reproducibility of analytical results. The reduction of the adsorbed metal ion, which corresponds to that of the exchange capacity in the conventional ion exchange method, speeds up excessively the elution of sample compounds so that no reproducible analytical results are obtained. Whereas in the present invention, thanks to the addition of the same metal ion to the eluting solution in such a manner as stated above, the content of adsorbed metal ion is not reduced, even when the solution is eluted through the column for a long period of time, so that one can expect reproducible results at any time. Thus, the present invention provides:

1. A method of separating components of mixtures by liquid chromatography which comprises adsorbing a weak basic metal ion, which is readily reactive with a sample mixture containing component materials having coordinative groups, to form complex compounds, on an ion exchange resin packed in a column; introducing said sample into said column and flowing it through said column; continuously eluting, thereby separating continuously said sample component materials depending on the differences of complex-forming forces between said sample component materials and said adsorbed metal ion; and detecting the separated sample component materials in a detecting system.

2. A method of separating components of mixtures by liquid chromatography which comprises using a metal salt-form resin column wherein a weak basic metal ion, which is readily reactive with a sample mixture containing component materials having coordinative groups to form complex compounds, is adsorbed on an ion exchange resin; a means for introducing said sample into said column; a pump for continuously feeding an eluting solution through said column to separate said sample components; and a detecting system for continuously detecting the separated sample components in the effluent from said column.

3. A method of separating components of mixtures by liquid chromatography which comprises adsorbing a weak basic metal ion, which is readily reactive with a sample mixture containing component materials having coordinative groups to form complex compounds, on an ion exchange resin packed in a column; introducing said sample into said column; continuously flowing an eluting solution through said column; continuously separating said sample component materials depending on the differences of complex-forming forces between said sample component materials and said adsorbed metal ion; developing color by using a reagent which effects a color-developing reaction with combined metal ions contained in said complex compounds in the eluting solution from said column; and continuously detecting the separated sample component materials by determining the light adsorbances of said complex compounds.

4. A method of separating components of mixtures by liquid chromatography which comprises using a metal salt-form resin column wherein a weak basic metal ion, which is readily reactive with a sample-containing component materials having coordinative groups to form complex compounds, is adsorbed on an ion exchange resin; a means for introducing said sample into said column; a pump for continuously feeding a eluting solution through said column to separate said sample component materials; and a detecting system comprising a means for developing color by using a reagent which effects a color-developing reaction with combined metal ions contained in said complex compounds in the eluting solution from said column and a means for detecting the separated sample component material by determining light adsorbances of said complex compounds.

5. A method of separating components of mixtures by liquid chromatography which comprises adsorbing a weak basic metal ion, which is readily reactive with a sample mixture containing component materials having coordinative groups to form complex compounds, on an ion exchange resin packed in a column; introducing said sample into said column; continuously flowing through said column an eluting solution, which contains the same metal ion in a concentration equilibrating with the content of said adsorbed metal ion on the resin so as to maintain said content constant at all times, to separate said sample component materials; continuously separating said sample component materials depending on the differences of complex forming forces between said sample component materials and said adsorbed metal ion; and detecting the separated sample component materials in a detecting system.

6. A method of separating components of mixtures by liquid chromatography which comprises using a metal salt-form resin column wherein a weak basic metal ion, which is readily reactive with a sample mixture containing component materials having coordinative groups to form complex compounds, is adsorbed on an ion exchange resin; a means for introducing said sample into said column; a pump for continuously feeding through said column an eluting solution, which is added with the same metal ion in a concentration equilibrating with the content of said adsorbed metal ion on the resin so as to maintain said content constant at all times, to separate said sample component materials; and a detecting system for continuously detecting the separated sample component materials in the eluting solution from said column.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
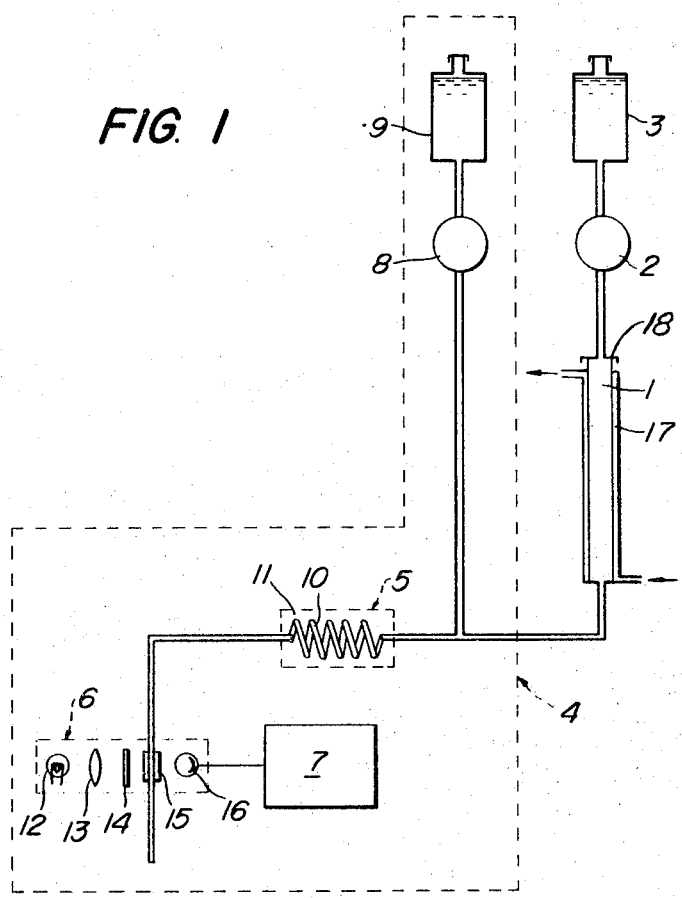
FIG. 1 is a diagrammatic view of an automatic liquid chromatograph which is one embodiment of the present invention.

Referring now to the drawings, like reference numerals are used throughout the various views to designate like parts of the present invention.

In FIG. 1, 1 designates a metal salt-form resin column wherein a weak basic metal ion, such as for example $Ni^{2+}$, $Cu^{2+}$, $Co^{2+}$, $Cd^{2+}$, $Hg^{2+}$, $Zn^{2+}$, $La^{3+}$ or $Y^{3+}$ is adsorbed on an ion exchange resin having, as ion exchange groups, sulfonic acid groups, carboxyl acid groups or imino-diacetic acid groups. The upper end of this column is connected, through the connecting cap 18, with pump 2 for feeding an eluting solution and container 3 which holds the solution. The lower end of the column is connected with a detecting system which is provided with reaction bath 5, photometer, 6, recorder 7, color-developing solution feeding pump 8 connected with the line between reaction bath 5 and the lower end of column 1, with a container for the color-developing solution 9. Reaction bath 5 is provided with mixing coil 10 and heating bath 11. Photometer 6 is provided with light source lamp 12, condenser lens 13, filter 14, flow cell 15 and detector 16. Around column 1 is provided jacket 17 for circulating warm water.

In the above disposition, when the eluting solution in container 3 is fed to column 1 in a certain amount by pump 2 and a sample comprising components having coordinate groups is added into the top portion of column 1, there in the above disposition, a sample comprising components having coordinative groups is added into the top portion of column 1 by a pipette after eliminating the connecting cap 18. When the eluting solution in container 3 is fed to column 1 in a certain amount by pump 2 after reconnecting the cap 18, there are caused differences in the migration rates of sample components due to differences in the complex-forming forces between the weak basic metal ion substantially adsorbed by the ion exchange resin of column 1 and the sample components. The components elute separately one after another from the lower end of column 1. When the color-developing solution in container 9 is fed by pump 8 in a certain rate, it is guided to reaction bath 5 together with the sample components separately eluting from the lower end of column 1. In said reaction bath, the sample components are well mixed with the color-developing solution by the mixing coil and develop color when heated by heating bath 11.

The color-developing solution is guided to photometer 6 to have its light absorbance continuously determined. More particularly, beams coming from light source lamp 12 are collected by condenser lens 13 and made monochromatic by a filter as desired. Monochromatic light projected in said flow cell is partially absorbed by the color-developed solution and enters detector 16 which emits signals corresponding to light absorbance. Signals are recorded to recorder 7. Thus, a chromatogram corresponding to the sample components is drawn on recording paper of the recorder 7.

The following examples are given merely as illustrative of the present invention and are not to be considered as limiting.

EXAMPLE I

Figure 2:
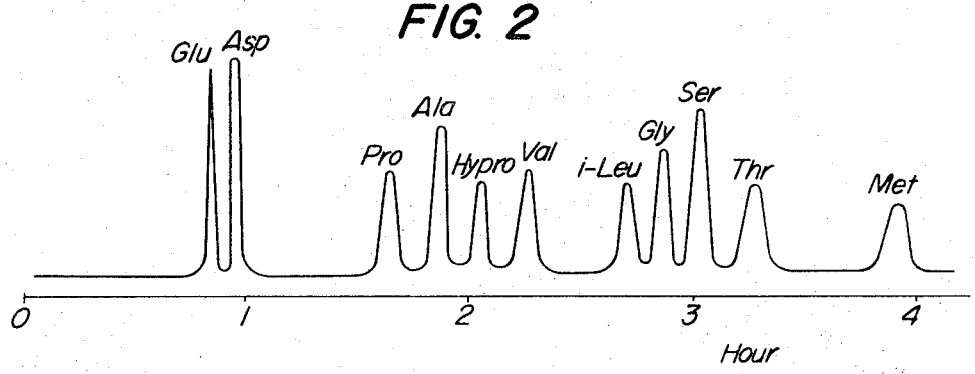
FIG. 2 is a chromatogram obtained by adopting the automatic liquid chromatograph of FIG. 1 and directed to acidic and neutral amino acids of glutamic acid, aspartic acid, proline, alanine, hydroxyproline, valine, i-leucine, glycine, serine and methionine.

FIG. 2 shows a chromatogram obtained by adopting the automatic liquid chromatograph shown in FIG. 1 and relating to acidic and neutral acids of glutamic acid, aspartic acid, proline, alanine, hydroxyproline, valine, i-leucine, glycine, serine and methionine. The total amount of sample containing about $0.5 \mu M$ each of respective amino acids is 0.5 ml. As ion exchange resin adsorbing weak basic metal ions, were used a sulfonic acid-type resin (Amberlite CG–120, III Type). As eluting solution, there was used an acetic acid-sodium acetate buffer solution of pH 6.0, containing $Na^+$ of 0,2 mol/liter and $Ni^{2+}$ of $10^{-3}$ mol/liter. The column was a nickel salt-form resin column, which was equilibrated until the concentration of $Ni^{2+}$ in the solution flowing out from the lower end of the column becomes $10^{-3}$ mol/liter. The column was 55 cm. in length and kept constantly at 80° C. The flow rate of eluting solution was 30 ml./min. and that of color-developing solution was 15 ml./min. As color-developing solution, ninhydrin reagent was used. Temperature of heating bath 11 was constantly 100° C. As wave length of absorption was used 570 $m\mu$ (For proline and hydroxyproline, 440 $m\mu$).

In FIG. 2, abscissa designates time (hours) and coordinate designates light absorbance. This applies also to FIGS. 3–6.

FIG. 2 shows that eleven amino acids were completely separated in about 4 hours. For alanine and glycine, and for glutamic acid and aspartic acid the eluting orders agree with those anticipated from the stability constants obtained in their aqueous solutions. In the conventional ion exchange method, glycine precedes alanine in elution, whereas when a nickel salt-form resin column is adopted, glycine which is stable as a complex compound, elutes after alanine.

The same holds true for the eluting order of glutamic acid and aspartic acid. As is anticipated from the stability constants that aspartic acid follows glutamic acid in elution, the result well agrees with this expectation. In case that the same conditions as in example I are used, but $Ni^{2+}$ is not adsorbed on the ion exchange resin and so not added to the eluting solution too, the above 11 amino acids are not separated and elute almost as one peak. This shows that the present invention is quite distinguished from the conventional ion exchange method as a separating method.

It is noted some complex forming reaction takes place also in the eluting solution, as the same ion $Ni^{2+}$ is added to the solution in order to maintain the content of $Ni^{2+}$ ion adsorbed on the resin constant. However, due to the high concentration of the adsorbed $Ni^{2+}$ ion, which is approximately two hundred times that of the eluting solution under the conditions utilized in FIG. 2, the migration rates of respective amino acids are mainly predominated by coordinative forces between the adsorbed $Ni^{2+}$ ion and the respective amino acids, in other words, by their stabilities as complex compounds.

EXAMPLE II

Figure 3:
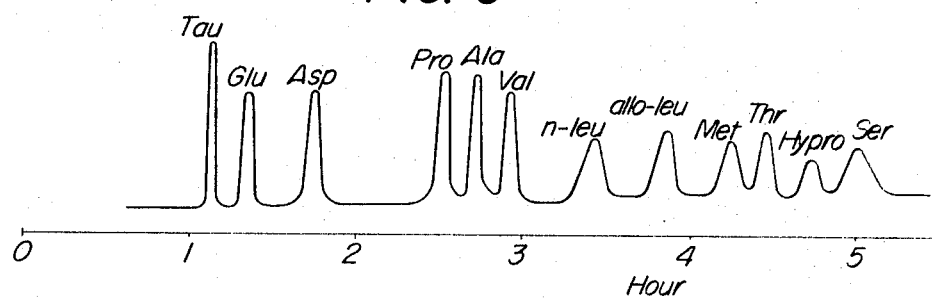
FIG. 3, is a chromatogram obtained by adopting the automatic liquid chromatograph of FIG. 1 and directed to acidic and neutral amino acids of taurine, glutamic acid, aspartic acid, proline, alanine, valine, n-leucine, alloleucine, methionine, threonine, hydroxyproline and serine.

FIG. 3 shows a chromatogram of acidic and neutral amino acids obtained by adopting the automatic liquid chromatograph of FIG. 1 and relating to taurine, glutamic acid, aspartic acid, proline, alanine, valine, n-leucine, allo-leucine, methionine, threonine, hydroxyproline and serine. As ion exchange resin, there was used a weak acidic carboxylic acid-type resin (Amberlite CG–50, III Type). As eluting solution there was used an acetic acid-sodium acetate buffer solution of pH 6.0 containing $Na^{2+}$ of 0.7 mol/liter and $Cu^{2+}$ of $10^{-4}$ mol/liter. The column was a copper salt-form resin column which was equilibrated until the concentration of $Cu^{2+}$ in the solution flowing out from the lower end of the column becomes $10^{-4}$ mol/liter. Column temperature was 30° C. Column length was 45 cm. Since $Cu^{2+}$ ion in the effluent interferes with the color-developing reaction of amino acids with ninhydrin reagent, sodium-ethylene-diaminetetraacetic acid of $10^{-3}$ mol/liter was preliminarily added to the ninhydrin reagent in the color-developing solution to suppress its interference.

Thus light absorbances of wavelength 570 $m\mu$ (for proline and hydroxyproline, 440 $m\mu$) were recorded. Other conditions were the same as in example I.

Figure 4:
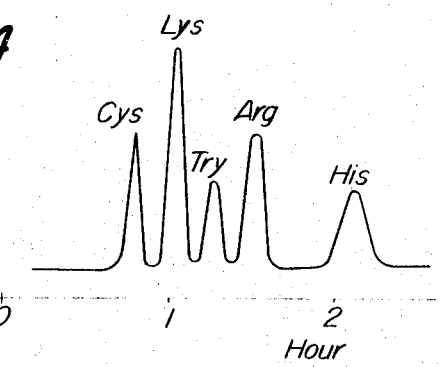
FIG. 4 is a chromatogram obtained by adopting the automatic liquid chromatograph of FIG. 1 and directed to basic amino acids of crystine, lysine, tryptophan, arginine and histidine.

FIG. 3 shows that the above 12 amino acids were separated in about 5 hours. Eluting order of glutamic acid and aspartic acid and that of alanine and glycine, similarly to example I agree with those anticipated from stability constants obtained from their aqueous solutions. Since basic amino acids such as lysine, tryptophan, arginine, histidine in a copper-complex are very stable, under an eluting condition of pH 6.0 under which the chromatogram of FIG. 3 is obtained, it takes a very long time to elute such basic amino acids. However, it is understood that by means of a column (16 cm.) equilibrated with an eluting solution of pH 5.0, containing $Na^{2+}$ of 0.9 mol/liter and $Cu^{2+}$ of $10^{-4}$ mol/liter, they were separated as well as cystine in about 2.5 hours as shown in FIG. 4. This shows that basic amino acids were separated in half the number of hours required by the conventional ion exchange method. Again in this case, differently from the ion exchange method, the eluting order of lysine and tryptophan and that of arginine and histidine are respectively inversed. This shows that the present invention differs from the ion exchange method.

EXAMPLE III

Figure 5:
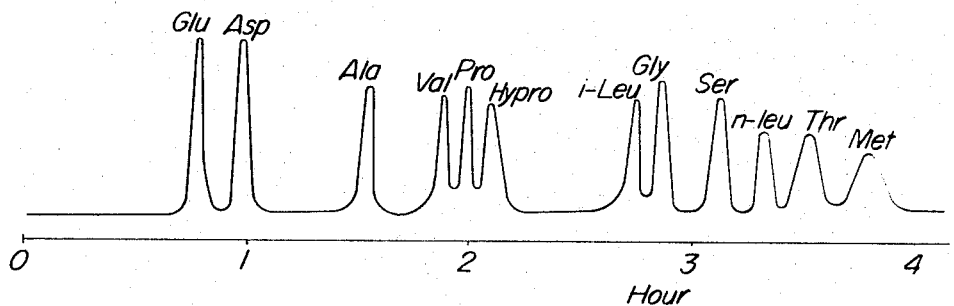
FIG. 5 is a chromatogram obtained by adopting the automatic liquid chromatograph of FIG. 1 and directed to acidic and neutral amino acids of glutamic acid, aspartic acid, alanine, valine, hydroxyproline, threonine and methionine.

FIG. 5 shows a chromatogram obtained by adopting the automatic liquid chromatograph of FIG. 1 and relating to acidic and neutral amino acids of glutamic acid, aspartic acid, alanine, valine, proline, hydroxyproline, i-leucine, glycine, serine, n-leucine, threonine and methionine.

As ion exchange resin, was used a strong acidic sulfonic acid-type resin (Amberlite CG-120, III Type). As eluting solution, was used an acetic acid-sodium acetate buffer solution of pH 6.05 containing $Na^+$ mol/liter and $Co^{2+}$ of $10^{-3}$ mol/liter. The column was a cobalt salt-form resin column which was equilibrated until the concentration of $Co^{2+}$ in the eluting solution flowing out from the lower end of the column becomes $10^{+3}$ mol/liter. Column length was 55 cm. and column temperature was constantly at 70° C. Other conditions were the same as in example I.

FIG. 5 shows that the above 12 amino acids were separated in about 4 hours.

Supposing that more than 10 kinds of acidic and neutral amino acids were separated by the conventional ion exchange method, such a very long column as high as 150 cm. would be required and moreover in one separating operation, the column temperature and eluting solution would have to be changed, and additionally, it would take more than 10 hours for separation. According to the present invention, as easily understood from examples I-III, the column is short in length, moreover the separation can be completed in the order of about 4 to 5 hours even without changing the column temperature and eluting solution. This shows that the present invention is particularly distinguished from the ion exchange method. Moreover, the present invention provides a simple-separating operation as well as a simplified apparatus.

EXAMPLE IV

Figure 6:
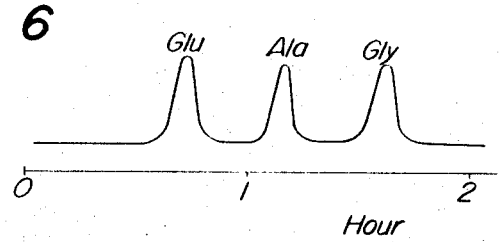
FIG. 6 is a chromatogram obtained by adopting the automatic liquid chromatograph of FIG. 1 and directed to glutamic acid, alanine and glycine.

FIG. 6 shows a chromatogram obtained by adopting the automatic liquid chromatograph of FIG. 1 and relating to glutamic acid, alanine and glycine. The total amount of sample comprising respective amino acids of 0.5 μM each was 0.5 ml.

As ion exchange resin, was used a weak acidic carboxylic acid-type resin (Amberlite CG-50, III Type). As eluting solution, was used an acetic acid-sodium acetate buffer solution of pH 6.0, containing $Na^+$ of 0.2 mol/liter and $Cu^{2+}$ of $10^{-4}$ mol/liter. Column was a copper salt-type column which was equilibrated until the concentration of $Cu^{2+}$ in the eluting solution flowing out from the lower end of the column becomes $10^{-4}$ mol/liter. Column temperature was constantly 25° C. Column length was 15.8 cm. The flow rate of eluting solution was 30 ml./min. and that of color-developing solution was 15 ml./min. As color-developing solution, was used, instead of ninhydrin reagent, 2-carboxy-2-hydroxy-5'-formazyl-benzene, which effects a color-developing reaction with amino acid compounds and $Cu^{2+}$ in the eluting solution from the lower end of the copper salt-form resin column, said reagent being added to 50 percent alcohol. Wavelength of absorption was 600 mμ.

FIG. 6 shows the light absorbance of a solution which developed color by the reaction of combined $Cu^{2+}$ contained in copper complex compounds consisting of amino acid compounds and $Cu^{2+}$ in the eluting solution from the lower end of the copper salt-forming resin column with 2-carboxy-2-hydroxy-5'-formazylbenzene. This reagent does not require a heating treatment as in the ninhydrin method and moreover is chemically very stable, so that it requires neither the absence of air nor cooling and storage in the dark.

As reagents of this kind, there may be similarly used various reagents such as xylenol orange and pyrocatechol violet as well as 2-carboxy-2-hydroxy-5'-formazylbenzene.

EXAMPLE V

The following table shows data showing the reproducibility of analytical results obtained by adopting the automatic liquid chromatograph shown in FIG. 1 and made on alanine, glycine and serine.

| Exp. No. | Alanine | Glycine | Serine |
|---|---|---|---|
| 1 | 1.26 | 1.70 | 2.27 |
| 2 | 1.23 | 1.72 | 2.23 |
| 3 | 1.24 | 1.75 | 2.25 |
| 4 | 1.23 | 1.67 | 2.26 |

As ion exchange resin, there was used a weak acidic carboxylic acid-type resin (Amberlite CG-50, III Type). As eluting solution, there was used an acetic acid-sodium acetate buffer solution of pH 6.0, containing $Na^+$ of 0.5 mol/liter and $Cu^{2+}$ of $10^{-4}$ mol/liter. The column was a copper salt-form resin column which was equilibrated until the concentration of $Cu^{2+}$ in the eluting solution flowing out from the lower end of the column becomes $10^{-4}$ mol/liter. Column length was 16.5 cm. Column temperature was constantly 25° C. The flow rate of eluting solution was 30 ml./min. and that of the color-developing solution was 15 ml./min. Since $Cu^{2+}$ in the eluting solution interferes with the color-developing reaction of amino acids with ninhydrin reagent, as color-developing solution, was used sodium ethylenediaminetetraacetic acid preliminarily added to ninhydrin so as to suppress such interference. Thus, light absorbances of wavelength 570 mμ were recorded. The total amount of sample comprising respective amino acids of 0.5 μM each was 0.5 ml. The numerical values of experiments numbered one to four, respectively, for alanine, glycine and serine are eluting times in hours.

From the above, it is understood that the same ion $cu^{2+}$ was added to the eluting solution in the concentration of $10^{-4}$ mol and equilibrated with the $Cu^{2+}$ ion absorbed on the resin in order to maintain the content of adsorbed ion constant at all times, so that the latter content was maintained constant even when the eluting solution was flown through the copper salt-type column for a long time and, accordingly, reproducible results could be obtained.

The invention being thus described, it will be obvious that the same may be varied in many ways. Such variations are not to be regarded as a departure from the spirit and scope of the invention, and all such modification are intended to be included within the scope of the following claims.

It is claimed:
1. A method of separating the components of a mixture by liquid chromatography, said mixture comprising component materials containing coordinative groups which are readily reactive with weakly basic metal ions to form coordinative bonds therebetween, which comprises the steps of absorbing said metal ions and an ion exchange column, introducing said mixture into said column, adding an eluting solution to said column, thereby separating the components of said mixture on the basis of the differences in coordinative bond-forming forces between the components of said mixture and said adsorbed metal ions, and detecting the separated components eluted from said column.

2. The method of claim 1, in which the metal ions are weakly basic metal ions and wherein the logarithmic values of the stability constants in a reaction between ethylenediaminetetraacetic acid and the weakly basic metals are at least greater than seven.

3. The method of claim 1, wherein the metal ions are selected from the group consisting of magnesium, calcium, strontium and barium.

4. The method of claim 1, wherein the metal ions are selected from the group consisting of cobalt, nickel, zinc, copper, cadmium, mercury and thorium.

5. The method of claim 1, wherein the metal ions are selected from the group consisting of lanthanum, yttrium, cerium, praseodymium, neodymium, prometheum, samarium, europium, gadolinium, terbium, dysprosium, holmium, erbium, thulium, ytterbium, lutetium and americium.

6. The method of claim 1, wherein the metal ions are selected from the group consisting of iron, manganese, scandium, gallium, chromium, zirconium, hafnium, indium, and titanium.

7. A method of separating the components of a mixture by liquid chromatography, said mixture comprising component materials containing coordinative groups which are readily reactive with weakly basic metal ions selected from the group consisting of magnesium, calcium, strontium, barium, cobalt, nickel, zinc, copper, aluminum, cadmium, mercury, vanadium, thallium, thorium, lanthanum, yttrium, cerium, praseodymium, neodymium, prometheum, samarium, europium, gadolinium, terbium, dysprosium, holmium, erbium, thulium, ytterbium, lutetium, americium, iron, manganese, scandium, gallium, chromium, zirconium, hafnium, indium, and titanium which comprises the steps of adsorbing said weakly basic metal ions on an ion exchange resin column, introducing said mixture into said column, thereby forming complex compounds between said metal ions and said coordinative groups, adding an eluting solution to said column, thereby separating the components of said mixture as their complexes on the basis of the differences in complex-forming forces between the components of said mixture and said adsorbed metal ions, and detecting the separated components eluted from said column.

8. The method of claim 7, wherein said mixture contains components selected from the group consisting of amino acids, amines and organic acids.

9. The method of claim 7, wherein said eluting solution contains the same metal ion as that adsorbed on said resin column, thereby maintaining the content of metal ion substantially constant on said column.

10. The method of claim 7, wherein said eluting solution contains the same metal ion as that adsorbed on said resin column, thereby maintaining the content of metal ion substantially constant on said column, and wherein a compound is added to said color developing reagent to suppress any interference in detection and analysis from free metal ions eluting from said column.

11. The method of claim 7, wherein the ion exchange resin column contains ion exchange groups selected from the group consisting of sulfonic acid groups, carboxylic acid groups and imino-diacetic acid groups.

12. The method of claim 7, wherein the components of the mixture to be separated are selected from the group consisting of glutamic acid, aspartic acid, proline, alanine, hydroxyproline, valine, n-leucine, allo-leucine, i-leucine, glycine, serine, methionine, threonine, taurine, lysine, tryptophan, arginine, histidine and cystine.

13. The method of claim 7, wherein a reagent is added to the effluent from the column which effects a color-developing reaction with the combined metal ions contained in the resultant complex compounds, and wherein the various components in said effluent are detected by determining the light absorbances of said complex compounds.

14. The method of claim 13, wherein the color developing reagent is selected from the group consisting of 2-carboxy-2-hydroxy-5′-formazylbenzene xylenol orange and pyrocatechol violet.

15. A method of separating amino acids contained in a mixture by liquid chromatography which comprises the steps of adsorbing weakly basic metal ions selected from the group consisting of magnesium, calcium strontium, barium, cobalt, nickel, zinc, copper, cadmium, aluminum, mercury, vanadium, thallium, thorium, lanthanum, yttrium, cerium, praseodymium, neodymium, prometheum, samarium, europium, gacolinium, terbium, dysprosium, holmium, erbium, thulium, ytterbium, lutefium, americium, iron, manganese, scandium, gallium, chromium, zirconium, hafnium, indium, indium and titanium, on an ion exchange resin column, introducing the mixture of amino acids into said column, thereby forming complex compounds between said metal ion and said amino acids, adding an eluting solution to said column, thereby separating the components of said mixture as their complexes on the basis of the differences in complex-forming forces between the different amino acids in said mixture and said adsorbed metal ions and detecting the separated components eluted from said column by the addition of a reagent to the effluent from the column which effects a color-developing reaction with the resultant complex compounds, the various amino acids in said effluent being detected by determining the light absorbances of said complex compounds.

16. The method of claim 15, wherein the color-developing reagent is selected from the group consisting of ninhydrin, 2-carboxy-2-hydroxy-5′-formazylbenzene, xylenol orange and pyrocatechol violet.

17. The method of claim 15, wherein said eluting solution contains the same metal ion as that adsorbed on said resin column, thereby maintaining the content of metal ion substantially constant on said column, and wherein the sodium salt of ethylenediaminetetraacetic acid is added to said color-developing reagent to suppress any interference in detection and analysis from free metal ions eluting from said column.

18. A method of separating the components of a mixture by liquid chromatography, said mixture comprising component materials containing coordinative groups which are readily reactive with weakly basic metal ions selected from the group consisting of nickel, copper, cobalt, cadmium, mercury, zinc, lanthanum and yttrium, which comprises the steps of adsorbing said weakly basic metal ions on an ion exchange resin column introducing said mixture into said column thereby forming complex compounds between said metal ions and said coordinative groups, adding an eluting solution to said column, thereby separating the components of said mixture as their complexes on the basis of the differences in complex-forming forces between the components of said mixture and said adsorbed metal ions, and detecting the separated components eluted from said column.

19. The method of claim 18, wherein said eluting solution contains the same metal ion as that adsorbed on said resin column, thereby maintaining the content of metal ion substantially constant on said column.

20. The method of claim 18, wherein said mixture contains components selected from the group consisting of amino acids, amines and organic acids.

21. The method of claim 18, wherein the ion exchange resin column contains ion exchange groups selected from the group consisting of sulfonic acid groups, carboxylic acid groups and imino-diacetic acid groups.

22. The method of claim 18, wherein a reagent is added to the effluent from the column which effects a color-developing reaction with the resultant compounds, and wherein the various components in said effluent are detected by determining the light absorbances of said complex compounds.

23. The method of claim 22, wherein the color-developing reagent is selected from group consisting of 2-carboxy-2-hydroxy-5′-formazylbenzene, xylenol orange and pyrocatechol violet.

24. The method of claim 22, wherein said eluting solution contains the same metal ion as that adsorbed on said resin columns, thereby maintaining the content of metal ion substantially constant on said column, and wherein a compound is added to said color-developing reagent to suppress any interference in detection and analysis from free metal ions eluting from said column.

25. A method of separating amino acids contained in a mixture by liquid chromatography which comprises the steps of adsorbing weakly basic metal ions selected from the groups consisting of nickel, copper, cobalt, cadmium, mercury, zinc, lanthanum and yttrium on an ion exchange resin column, introducing the mixture of amino acids into said column, thereby forming complex compounds between said metal ion and said amino acids, adding an eluting solution to said column, thereby separating the components of said mixture as their complexes on the basis of the differences in complex-forming forces between the different amino acids in said mixture and said adsorbed metal ions, and detecting the separated components eluted from said column by the addition of a reagent to the effluent from the column which effects a color-developing reaction with the resultant complex compounds, the various amino acids in said effluent being detected by determining the light absorbances of said complex compounds.

26. The method of claim 25, wherein the color developing reagent is selected from the group consisting of ninhydrin, 2-carboxy-2-hydroxy-5'-formazylbenzene, xylenol orange and pyrocatechol violet.

27. The method of claim 25, wherein said eluting solution contains the same metal ions as that adsorbed on said resin column, thereby maintaining the content of metal ion substantially constant on said column, and wherein the sodium salt of ethylenediaminetetraacetic acid is added to said color-developing reagent to suppress any interference in detection and analysis from free metal ions eluting from said column.

* * * * *

UNITED STATES PATENT OFFICE
CERTIFICATE OF CORRECTION

Patent No. 3,630,681      Dated December 28, 1971

Inventor(s) Yoshijiro ARIKAWA

It is certified that error appears in the above-identified patent and that said Letters Patent are hereby corrected as shown below:

Title page, left column, line 9, which now reads:

"393,539, Sept. 1, 1964, now abandoned."

should read as follows:

-- 393,539, Sept. 1, 1964, now abandoned, which claims priority, application Japan, September 3, 1963, 46393/63 and application Japan, September 3, 1963, 46394/63. --

Signed and Sealed this fourth Day of November 1975

[SEAL]

Attest:

RUTH C. MASON
*Attesting Officer*

C. MARSHALL DANN
*Commissioner of Patents and Trademarks*